(12) United States Patent
Tokonami et al.

(10) Patent No.: US 11,420,665 B2
(45) Date of Patent: Aug. 23, 2022

(54) HEIGHT ADJUSTING STRUCTURE FOR CASING, AND ACCESSORY DEVICE FOR IMAGE FORMING APPARATUS

(71) Applicant: KYOCERA Document Solutions Inc., Osaka (JP)

(72) Inventors: Minoru Tokonami, Osaka (JP); Masami Fuchi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 252 days.

(21) Appl. No.: 16/854,989

(22) Filed: Apr. 22, 2020

(65) Prior Publication Data

US 2020/0339172 A1   Oct. 29, 2020

(30) Foreign Application Priority Data

Apr. 24, 2019   (JP) .............................. JP2019-082906

(51) Int. Cl.
*B62B 3/02*     (2006.01)
*H04N 1/00*     (2006.01)

(52) U.S. Cl.
CPC .......... *B62B 3/02* (2013.01); *H04N 1/00557* (2013.01); *H04N 1/00559* (2013.01); *B62B 2206/06* (2013.01); *B62B 2301/05* (2013.01)

(58) Field of Classification Search
CPC .............. B60B 33/0081; B60B 33/025; B60B 33/0021; B60B 33/0049; B60B 33/021; B60B 33/026; B60B 33/0073; B60B 33/0039; B60B 33/0057; B60B 33/0092; B60B 33/0068; A61G 7/00; A61G 7/05; A61G 7/0528; Y10T 16/195
See application file for complete search history.

(56) References Cited

U.S. PATENT DOCUMENTS

| | | | | | |
|---|---|---|---|---|---|
| 5,457,849 | A | * | 10/1995 | Branson | .................. B60B 33/04 16/33 |
| 5,745,951 | A | * | 5/1998 | Waner | ................. B60B 33/0007 16/31 R |
| 5,774,936 | A | * | 7/1998 | Vetter | ................... B60B 33/021 16/35 R |
| 6,637,071 | B2 | * | 10/2003 | Sorensen | ............ B60B 33/0057 16/33 |
| 6,810,561 | B1 | * | 11/2004 | Liu | ..................... B60B 33/0068 16/37 |

(Continued)

FOREIGN PATENT DOCUMENTS

JP   2015-184393   10/2015

*Primary Examiner* — Toan C To
(74) *Attorney, Agent, or Firm* — Wenderoth, Lind & Ponack, L.L.P.

(57) ABSTRACT

A height adjusting structure includes a coupling member configured to couple a caster to a casing, and the coupling member has a fixing part to which the caster is fixed, an extended part extended upward from the fixing part and penetrating through a bottom wall of the casing, and a meshing part formed at a portion within the casing on the extended part and having a plurality of engaging portions aligned at a predetermined pitch in a vertical direction. The height adjusting structure further includes a restraining member meshing with the meshing part formed on the extended part to restrain the extended part so that the extended part is unable to move vertically.

9 Claims, 15 Drawing Sheets

(56) References Cited

U.S. PATENT DOCUMENTS

| | | | | |
|---|---|---|---|---|
| 6,865,775 B2* | 3/2005 | Ganance | ............ | B60B 33/0081 16/35 R |
| 7,350,269 B2* | 4/2008 | Dominic | ............ | B60B 33/0002 16/30 |
| 7,798,455 B2* | 9/2010 | Kumazawa | .......... | A47B 3/0815 248/346.11 |
| 11,247,509 B2* | 2/2022 | Hartkopf | ............. | B60B 33/0068 |
| 2001/0042286 A1* | 11/2001 | Henriott | ............. | B60B 33/0021 16/29 |
| 2018/0319214 A1* | 11/2018 | Renno | ................ | B60B 33/0097 |

* cited by examiner

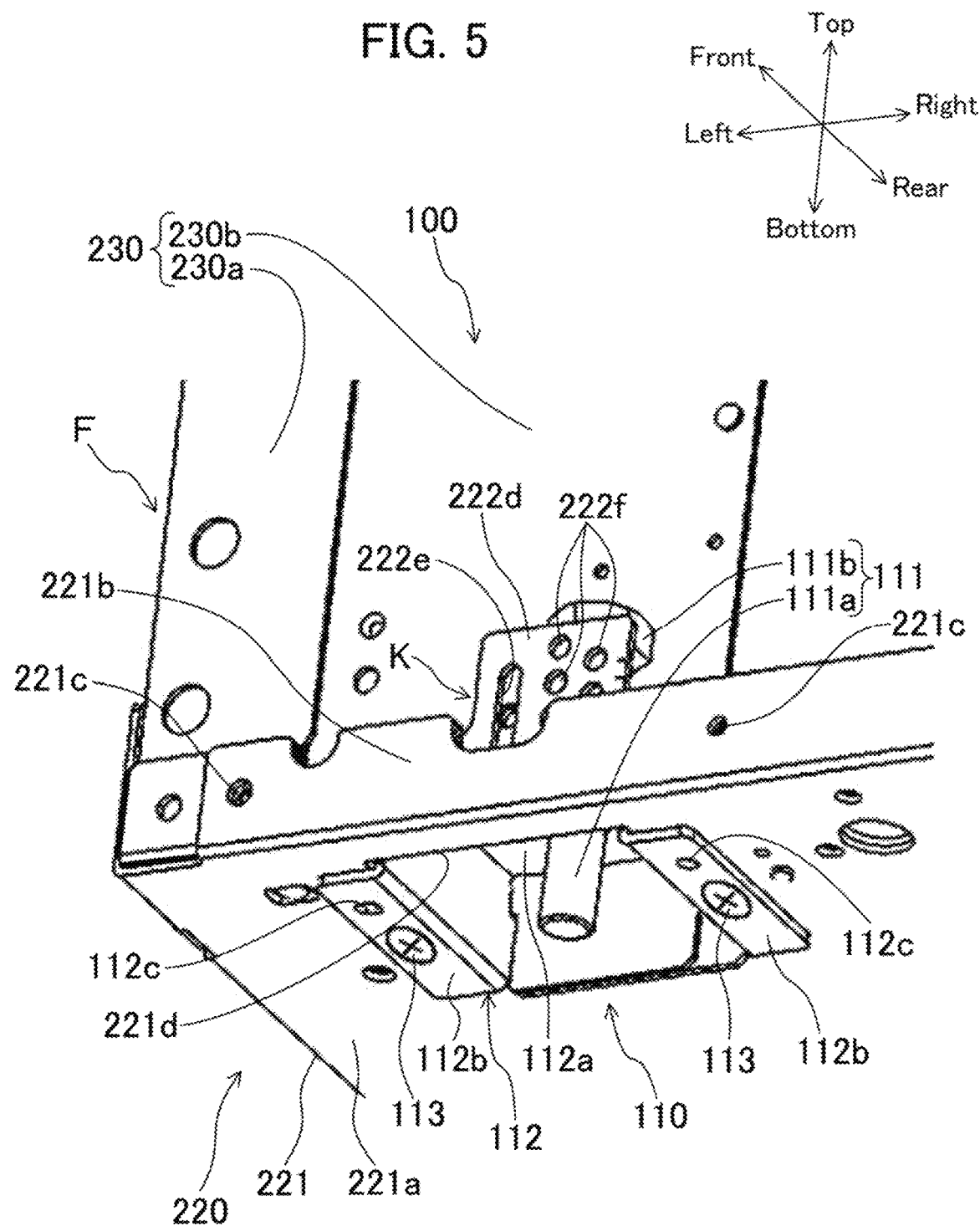

FIG. 6C
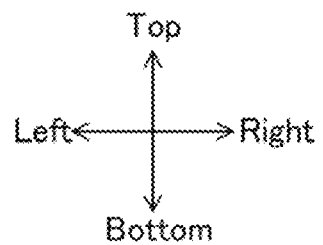
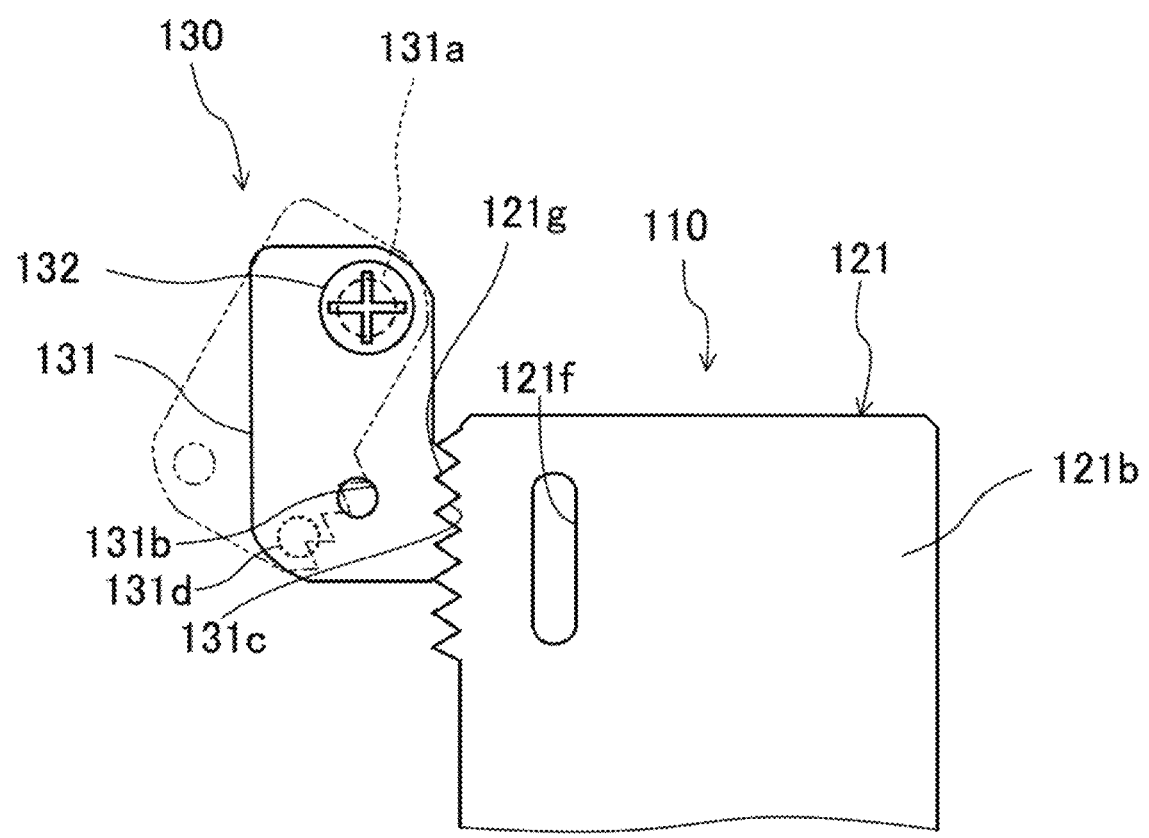

FIG. 8
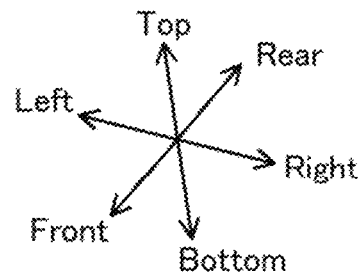
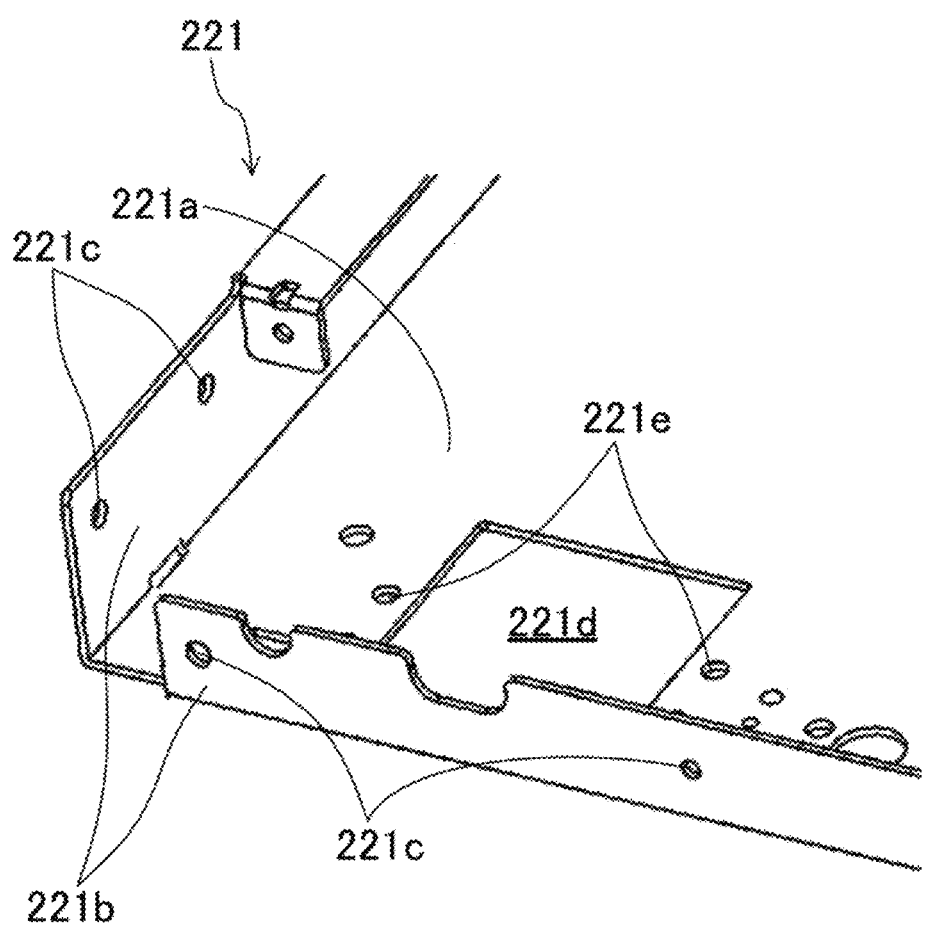

FIG.9B
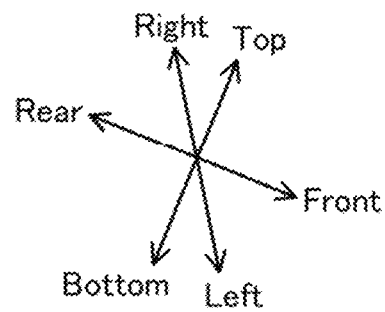
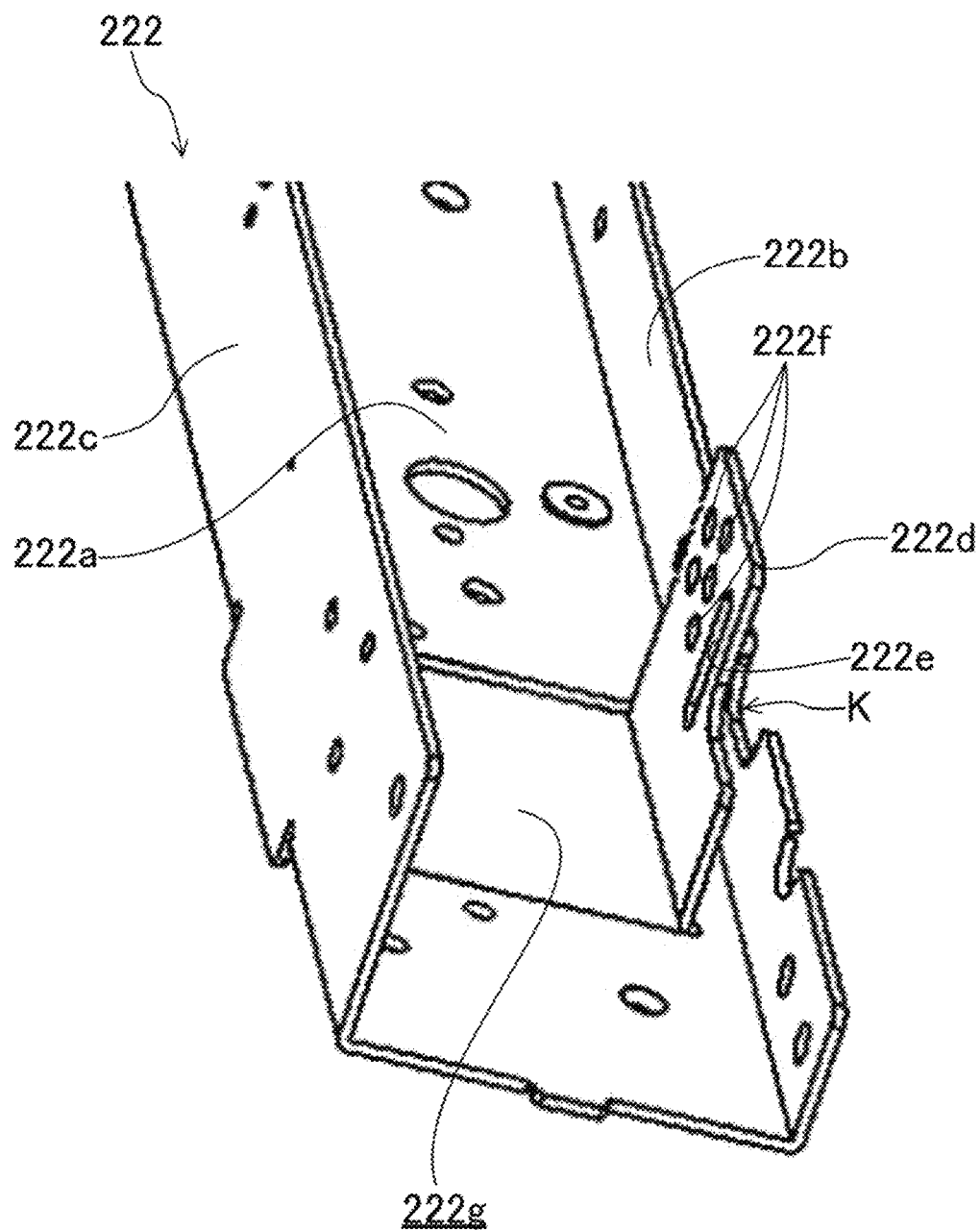

HEIGHT ADJUSTING STRUCTURE FOR CASING, AND ACCESSORY DEVICE FOR IMAGE FORMING APPARATUS

CROSS-REFERENCE TO RELATED APPLICATION(S)

This application is based upon and claims the benefit of priority from Japanese Patent Application No. 2019-082906 filed on Apr. 24, 2019, the entire contents of which are incorporated herein by reference.

BACKGROUND

The technology disclosed herein relates to a height adjusting structure for a casing, and also relates to an accessory device for an image forming apparatus.

A height adjusting structure for a casing having a caster provided on the bottom thereof has been known which includes a screw hole formed in a bottom wall of the casing and an adjustment bolt inserted through the screw hole. The adjustment bolt has a threaded portion formed on an outer peripheral surface thereof, which is threadedly engaged with the screw hole. The caster is attached to a lower end of the adjustment bolt. In this height adjusting structure, an amount of protrusion of the adjustment bolt from the bottom wall of the casing is adjusted by rotating the adjustment bolt screwed in the screw hole, whereby the height at which the casing is supported by the caster is adjusted. After the adjustment of the height of the casing is completed, a pair of nuts are respectively screwed and tightened onto the adjustment bolt from the upper and lower sides of the bottom wall of the casing to fix the adjustment bolt and the bottom wall of the casing together.

SUMMARY

An aspect of the present disclosure provides a height adjusting structure including an adjustment bolt and a caster. The adjustment bolt is inserted through a screw hole formed in a bottom wall of a casing. The caster supports a lower end of the adjustment bolt.

The height adjusting structure includes a coupling member configured to couple the caster to the casing. The coupling member has a fixing part, an extended part, and a meshing part. The caster is fixed to the fixing part. The extended part is extended upward from the fixing part and penetrates through the bottom wall of the casing. The meshing part is formed at a portion within the casing on the extended part. The meshing part has a plurality of engaging portions aligned at a predetermined pitch in a vertical direction. The casing has a fixed part therein. The extended part of the coupling member is fixed to the fixed part via a fastening member. The height adjusting structure further includes a restraining member. The restraining member meshes with the meshing part of the coupling member with the extended part of the coupling member fixed with the fixed part of the casing, thereby restraining the extended part so that the extended part is unable to move vertically.

Another aspect of the present disclosure provides an accessory device for an image forming apparatus. The accessory device has the above-described height adjusting structure provided thereon.

BRIEF DESCRIPTION OF THE DRAWINGS

FIG. 5 is a perspective view of the height adjusting structure illustrated FIG. 3, shown with a caster unit removed;

FIG. 6C is a front view of the displacement preventing unit included in the height adjusting structure;

FIG. 8 is a perspective view of a base member constituting the frame part;

FIG. 9B is a perspective view of the stay constituting the frame part;

DETAILED DESCRIPTION

Hereinafter, an example embodiment of the present disclosure will be described in detail on the basis of the drawings. It should be understood that the technology disclosed herein is not limited to the embodiment described below.

Embodiment

[Overall Configuration]

Figure 1:
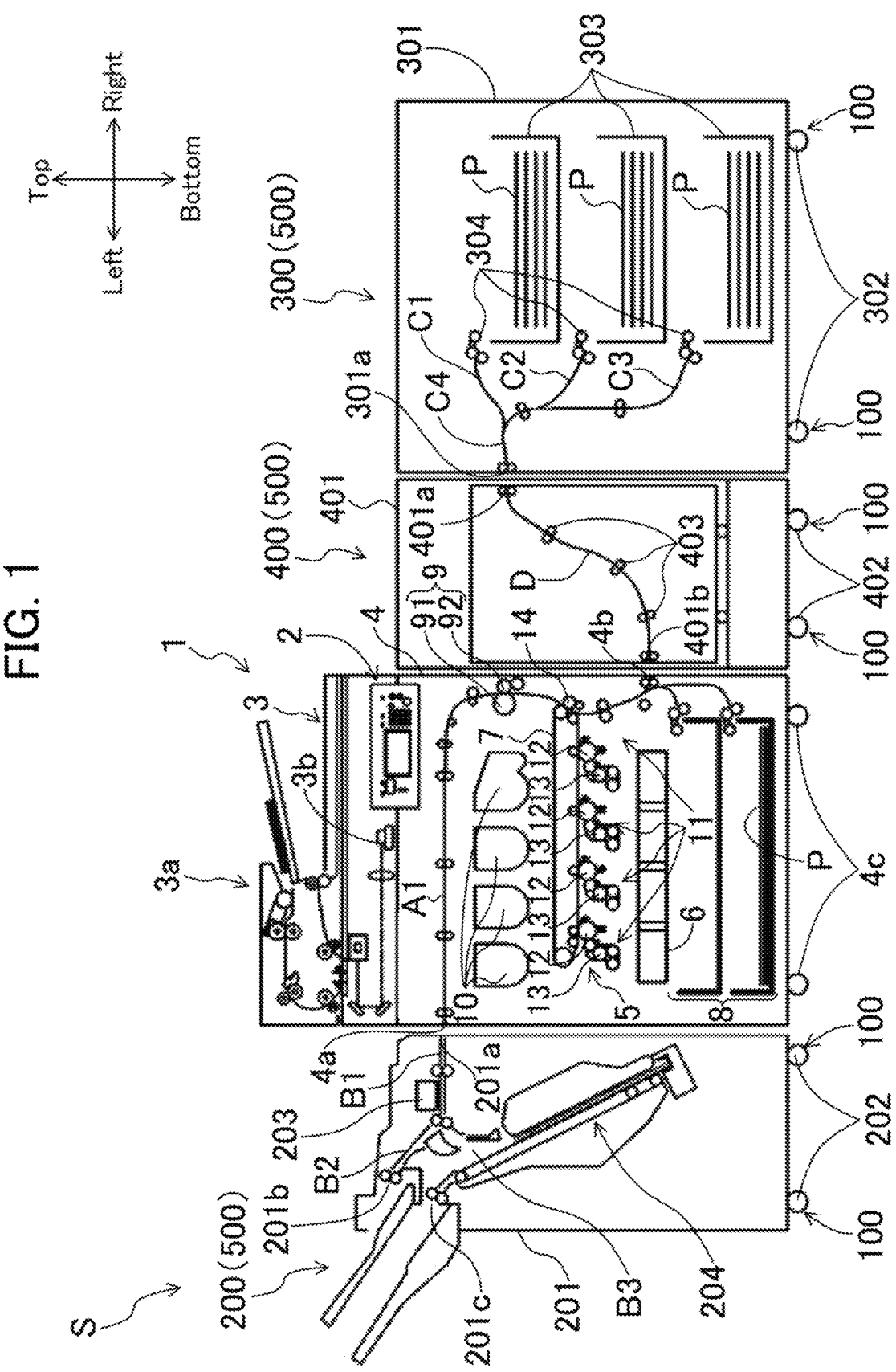
FIG. 1 is a schematic diagram illustrating the configuration of an image forming system including an image forming apparatus and accessory devices each having a height adjusting structure according to an embodiment of the present disclosure provided thereon.

FIG. 1 is a schematic diagram illustrating an image forming system S including an image forming apparatus 1 and accessory devices 500 that each have provided thereon a height adjusting structure 100 according to an embodiment of the present disclosure. Note that the definitions of the terms "front", "rear", "left", and "right" as used in the description below refer to the directions identified at the upper right corner in FIG. 1.

The image forming apparatus 1 is a copying machine which reads an image of a document and prints the image. A post-processing device 200, as an example accessory device 500, is arranged on the left of the image forming apparatus 1, and a sheet feed device 300 and an intermediate conveyance device 400, each also as an example accessory device 500, are arranged on the right of the image forming apparatus 1.

The image forming apparatus 1 includes an image forming apparatus body 2 and an image reader 3 arranged on the image forming apparatus body 2.

The image reader 3 optically reads an image of a document, which is, for example, fed thereinto by an automatic document feeder 3a, with an image sensor 3b such as a CCD sensor, and generates image data of the read image.

The image forming apparatus body 2 has a rectangular parallelepiped casing 4. The casing 4 has casters 4c respectively attached to four corners of a bottom surface thereof, and houses an image forming part 5. The image formation part 5 transfers a toner image onto a sheet P on the basis of image data generated by the image reader 3. An exposure device 6 that radiates a laser beam is arranged under the image forming part 5, and a transfer belt 7 is arranged above the image forming part 5. A sheet storing unit 8 that stores sheets P is arranged under the exposure device 6. A fixing unit 9 that fixes an image transferred on a sheet P is arranged above a right end of the transfer belt 7. Note that reference numeral 10 in the drawings denotes a toner container containing a toner as a developer.

The image forming part 5 includes four image forming units 11 aligned along the transfer belt 7. Each image forming unit 11 includes a photosensitive drum 12 and a developing device 13 arranged on a lateral side of the photosensitive drum 12. A laser beam radiated by the exposure device 6 forms an electrostatic latent image on a peripheral surface of each photosensitive drum 12. Each developing device 13 supplies a developer to its corresponding electrostatic latent image, so that toner images of yellow, magenta, cyan, and black are respectively formed on the peripheral surfaces of the photosensitive drums 12. The toner images are transferred onto the transfer belt 7 in a superimposed manner, and the transferred toner images are then transferred onto a sheet P by a transfer bias applied by a transfer roller 14 disposed adjacently to the right end of the transfer belt 7. Note that the sheet P is fed from the sheet storing unit 8 provided at the bottom in the casing 4 or from the above-mentioned intermediate conveyance device 400. The casing 4 has a sheet inlet 4b formed in a right side surface thereof, which receives a sheet P fed from the intermediate conveyance device 400.

The fixing unit 9 includes a heat roller 91 and a pressure roller 92. The fixing unit 9 heats a sheet P while holding and pressing the sheet P between the heat roller 91 and the pressure roller 92. Thus, the fixing unit 9 fixes the toner images transferred on the sheet P by the transfer roller 14 on the sheet P by heating and pressing. The sheet P subjected to the fixing process is fed through a horizontal conveyance passage A1 provided at an upper position in the casing 4, and is discharged through a sheet outlet 4a formed in a left side surface of the casing 4. The sheet P discharged through the sheet outlet 4a is fed to the post-processing device 200.

[Configuration of Post-Processing device 200]

The post-processing device 200 is an accessory device 500 that is attached later to the left side surface of the casing 4 of the image forming apparatus 1. The post-processing device 200 performs a post-processing, e.g., stapling, on a sheet P having an image formed thereon. Specifically, the post-processing device 200 has a rectangular parallelepiped casing 201 elongated in a vertical direction. The casing 201 has casters 202 respectively attached to four corners of a bottom surface thereof, which are used for moving the post-processing device 200. The casing 201 has a sheet inlet 201a formed in a right side surface thereof, which receives a sheet P discharged through the sheet outlet 4a of the casing 4 of the image forming apparatus 1. The casing 201 has an upper sheet outlet 201b and a lower sheet outlet 201c formed in a left side surface thereof, through which a sheet P subjected to the post-processing is discharged.

The post-processing device 200 has a horizontal conveyance passage B1 therein that extends to the left from the sheet inlet 201a. A hole-punching unit 203 that punches a hole in a sheet P is provided above the horizontal conveyance passage B1. The horizontal conveyance passage B1 branches into an upper-branch conveyance passage B2 and a lower-branch conveyance passage B3 at a downstream end thereof. The upper-branch conveyance passage B2 guides a sheet P fed through the horizontal conveyance passage B1 to the upper sheet outlet 201b. The lower-branch conveyance passage B3 guides a sheet P fed through the horizontal conveyance passage B1 to a stapling unit 204. The stapling unit 204 forms a bundle of stacked sheets by giving sheets P a tilt, and inserts a staple into a lower end portion of the bundle of stacked sheets. The stapling unit 204 discharges the stapled bundle of stacked sheets through the lower sheet outlet 201c.

[Configuration of Sheet Feed Device 300]

The sheet feed device 300 is used in a case where, in printing for a business purpose or the like, the required number of sheets to be printed exceeds the capacity of the sheet storing unit 8 of the image forming apparatus 1. Specifically, the sheet feed device 300 has a rectangular parallelepiped casing 301. The casing 301 has casters 302 respectively attached to four corners of a bottom surface thereof. The casing 301 has three sheet feed cassettes 303 therein that are arranged in three layers in the vertical direction. Sheets P stored in the sheet feed cassettes 303 are respectively fed to sheet conveyance passages C1 to C3 by pick-up rollers 304. Downstream ends of the sheet conveyance passages C1 to C3 are connected to a common conveyance passage C4. A downstream end of the common conveyance passage C4 is connected to a sheet outlet 301a formed in an upper portion of a left side surface of the casing 301. A sheet P discharged through the sheet outlet 301a is fed to the intermediate conveyance device 400.

[Configuration of Intermediate Conveyance Device 400]

The intermediate conveyance device 400 is arranged between the sheet feed device 300 and the image forming apparatus 1 so as to receive a sheet P discharged from the sheet feed device 300 and feed the sheet P to the image forming apparatus 1. Specifically, the intermediate conveyance device 400 has a rectangular box-shaped casing 401. The casing 401 has casters 402 respectively attached to four corners of a bottom surface thereof, which are used for moving the intermediate conveyance device 400. The casing 401 has a sheet inlet 401a formed in an upper portion of a right side surface thereof, which receives a sheet P discharged through the sheet outlet 301a of the sheet feed device 300. The casing 401 has a sheet outlet 401b formed in a lower portion of a left side surface thereof. The casing 401 has an intermediate conveyance passage D therein that is inclined downward to the left from the sheet inlet 401a to the sheet outlet 401b. Further, a plurality of pairs of conveyance rollers 403 are arranged along the intermediate conveyance passage D.

[Configuration of Height Adjusting Structure 100]

Here, note that the post-processing device 200, the sheet feed device 300, and the intermediate conveyance device 400 are accessory devices 500 additionally attached to the image forming apparatus 1. If the height at which a sheet P is transferred differs between adjacent devices, sheet jam can occur in the image forming process, which can make printing impossible. To avoid this problem, a height adjusting structure 100 is provided on each of the accessory devices 500 (the post-processing device 200, the sheet feed device 300, and the intermediate conveyance device 400). The height adjusting structures 100 provided on the accessory devices 500 have the same basic configuration; therefore, only the height adjusting structure 100 provided on the post-processing device 200 is described below.

Figure 2:
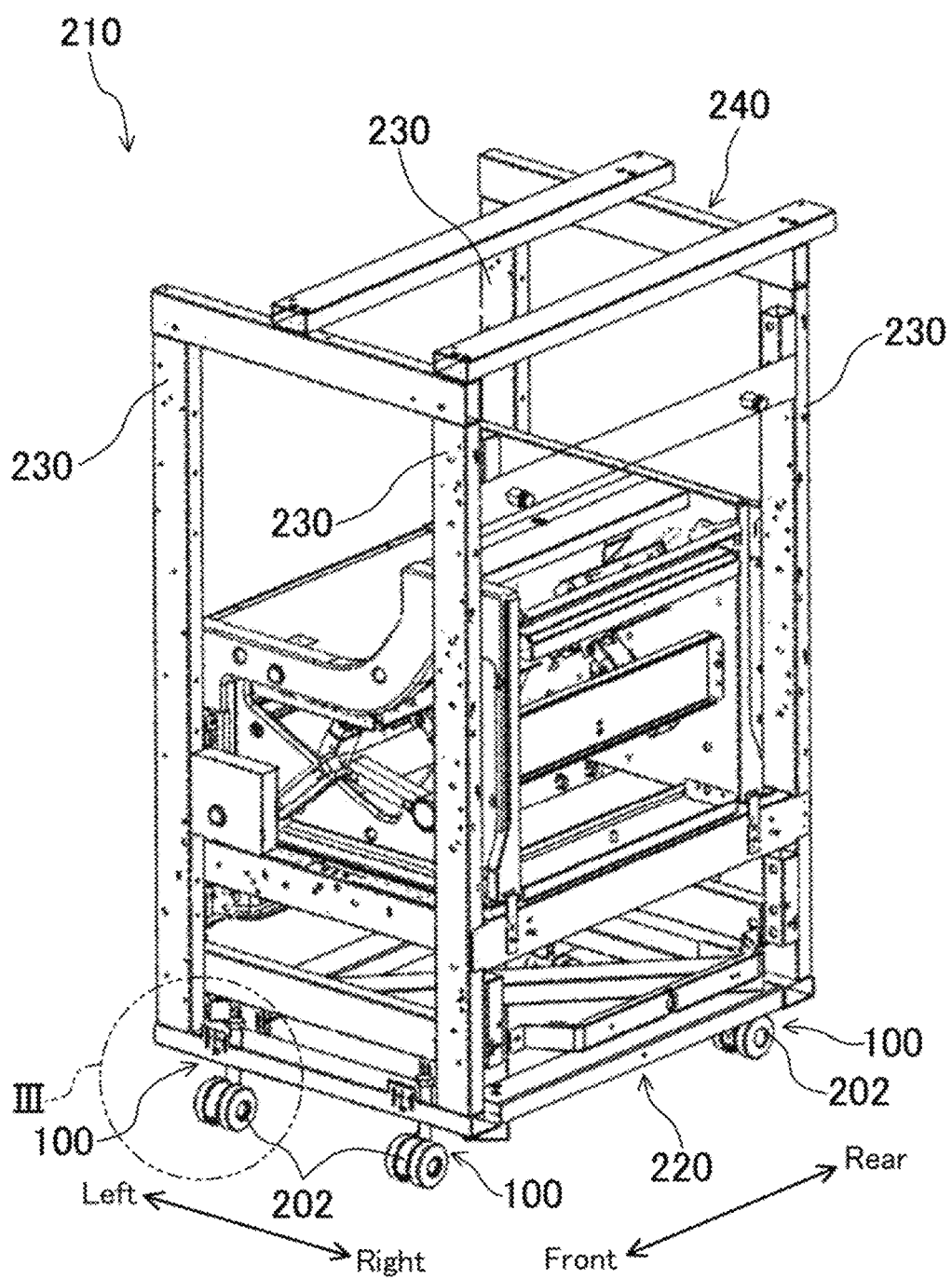
FIG. 2 is a perspective view of a casing frame of a post-processing device.

FIG. 2 illustrates a casing frame 210 of the post-processing device 200. The casing frame 210 has the height adjusting structure 100 provided on each of four corners of a bottom end thereof for adjusting the height at which the casing 201 is supported by the casters 202.

The casing frame 210 of the post-processing device 200 has a bottom frame 220, four posts 230 extending upward from four corners of the bottom frame 220, and a top frame 240 provided on upper ends of the four posts 230.

Figure 3:
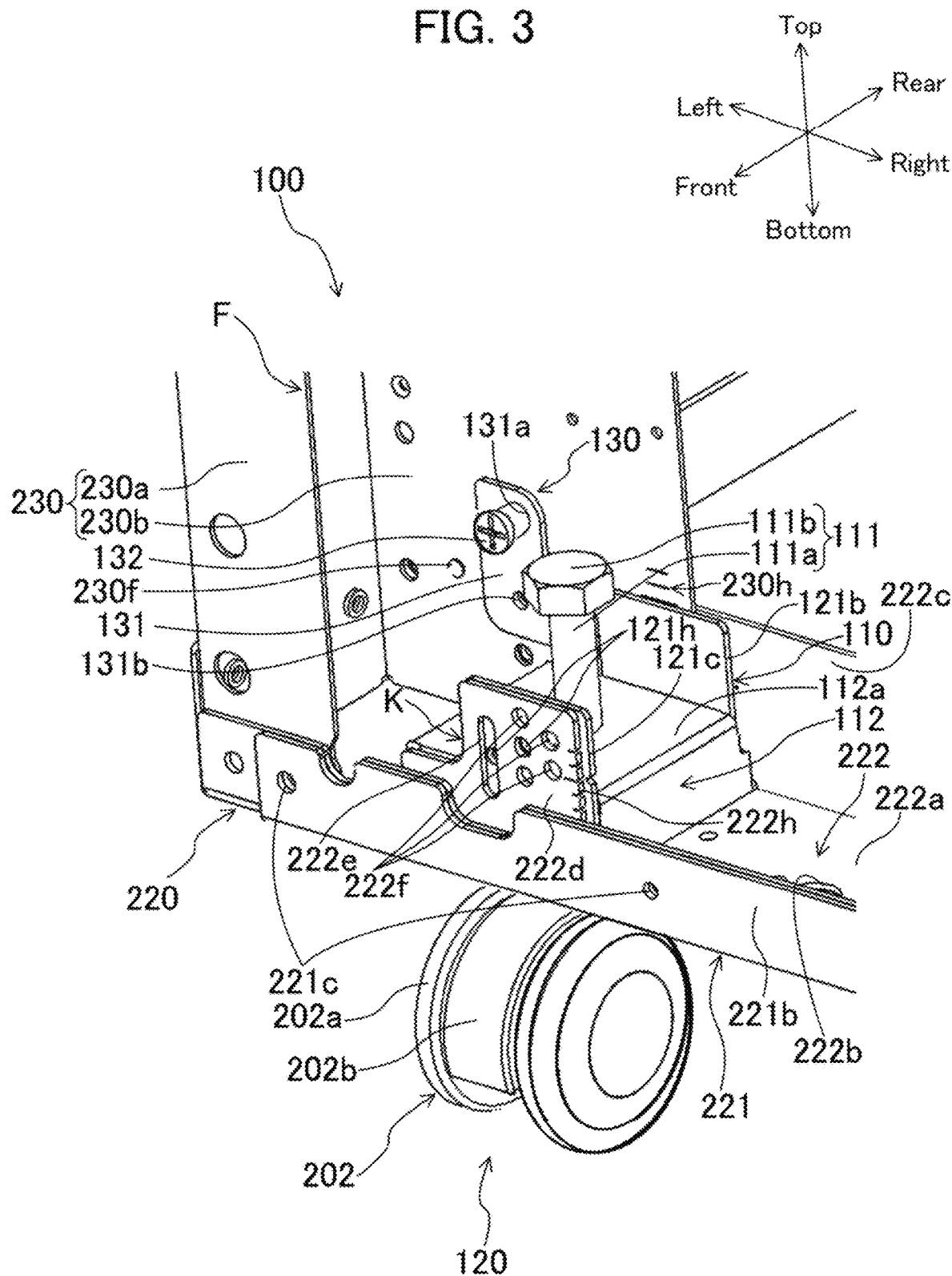
FIG. 3 is an enlarged perspective view of the height adjusting structure provided at a front left corner of the casing frame (an enlarge view of portion III in FIG. 2)

FIG. 3 is an enlarged perspective view of the height adjusting structure 100 provided on the front left corner of the casing frame 210 (an enlarged view of portion III in FIG. 2). Note that this height adjusting structure 100 is identical to the other three height adjusting structures 100 provided on the other three corners of the casing frame 210. Therefore, description of the other three height adjusting structures 100 are omitted in the following description.

As shown in FIG. 3, the height adjusting structure 100 includes an adjusting unit 110 attached to the bottom frame 220, a caster unit 120 attached to the adjusting unit 110, and a displacement preventing unit 130 preventing vertical displacement of the caster unit 120.

Figure 4:
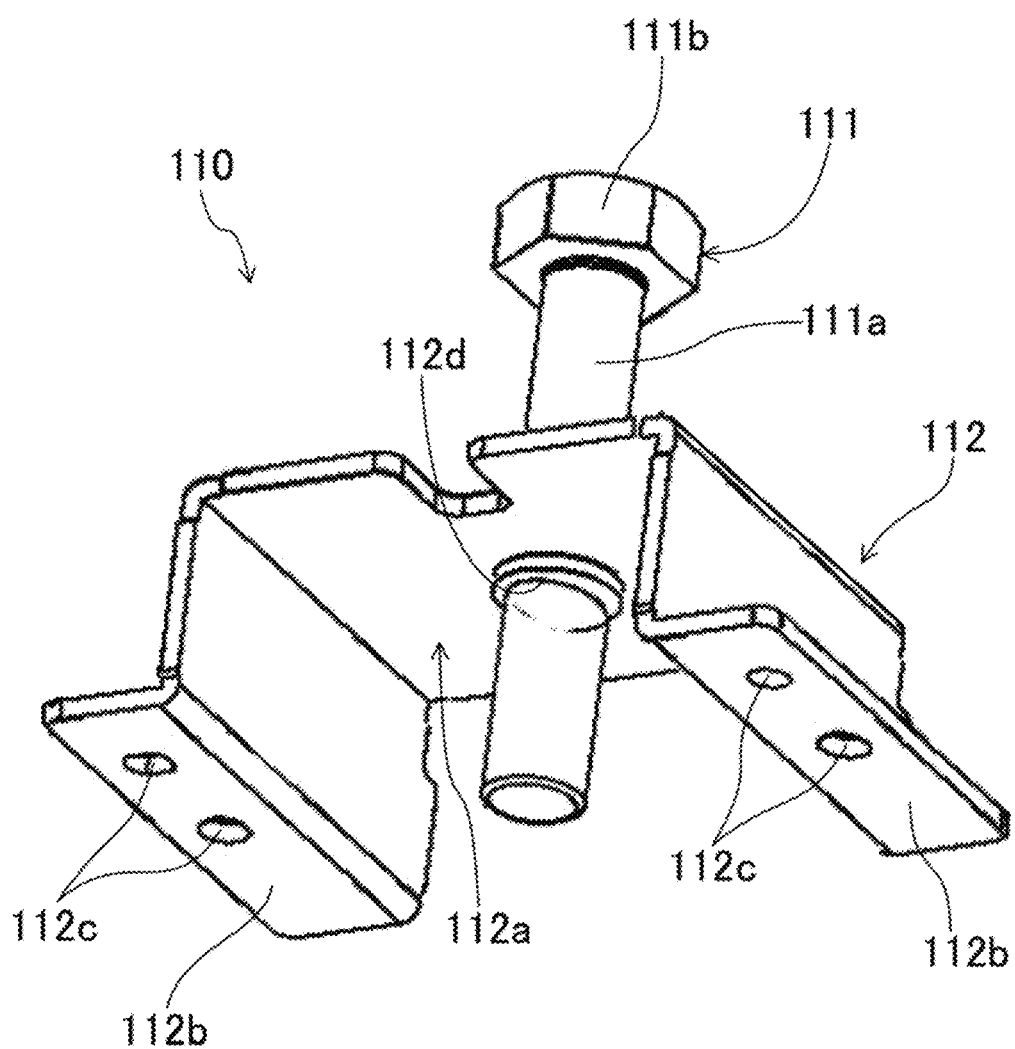
FIG. 4 is a perspective view of an adjusting unit included in the height adjusting structure.

FIG. 4 is an enlarged perspective view of the adjusting unit 110. The adjusting unit 110 includes an adjustment bolt 111 and a support member 112 supporting the adjustment bolt 111.

The adjustment bolt 111 has a rod 111a having a threaded portion formed on the entire peripheral surface thereof, and a head 111b formed on an upper end of the rod 111a. The head 111b has an engagement groove (not illustrated) formed thereon which engages with a distal end of a tool such as a Philips screwdriver.

The support member 112 has a square U-shaped plate portion 112a having a square U-shaped cross section as viewed in a plate width direction, and has a pair of attachment pieces 112b respectively protruding outward from both ends of the square U-shaped plate portion 112a. The support member 112 is formed by, for example, bending a single metal plate. Each attachment piece 112b has two attachment holes 112c formed therein. An upper wall of the square U-shaped plate portion 112a (a flat plate connecting mutually opposed walls of the square U-shaped plate portion 112a) has a screw hole 112d formed therein which penetrates in a thickness direction. The rod 111a of the adjustment bolt 111 is inserted therethrough the screw hole 112d. The threaded portion formed on the peripheral surface of the rod 111a is screwed with an inner peripheral surface of the screw hole 112d. A lower end of the adjustment bolt 111 is coupled to the caster unit 120.

FIG. 5 is a perspective view of the height adjusting structure 100 illustrated in FIG. 3, shown with the caster unit 120 removed. This perspective view makes it easy to understand the structure attaching the adjusting unit 110 to the bottom frame 220. Specifically, the adjusting unit 110 is fitted in a rectangular opening 221d formed in a base member 221 of the bottom frame 220, thereby being fixed to a lower surface of the base member 221. In this fixed state, the square U-shaped plate portion 112a of the support member 112 of the adjusting unit 110 (see FIG. 3) penetrates through the rectangular opening 221d and protrudes upward from the base member 221. The attachment pieces 112b coupled to the square U-shaped plate portion 112a are fixed to the lower surface of the base member 221 by screws 113 (see FIG. 5).

Figure 6A:
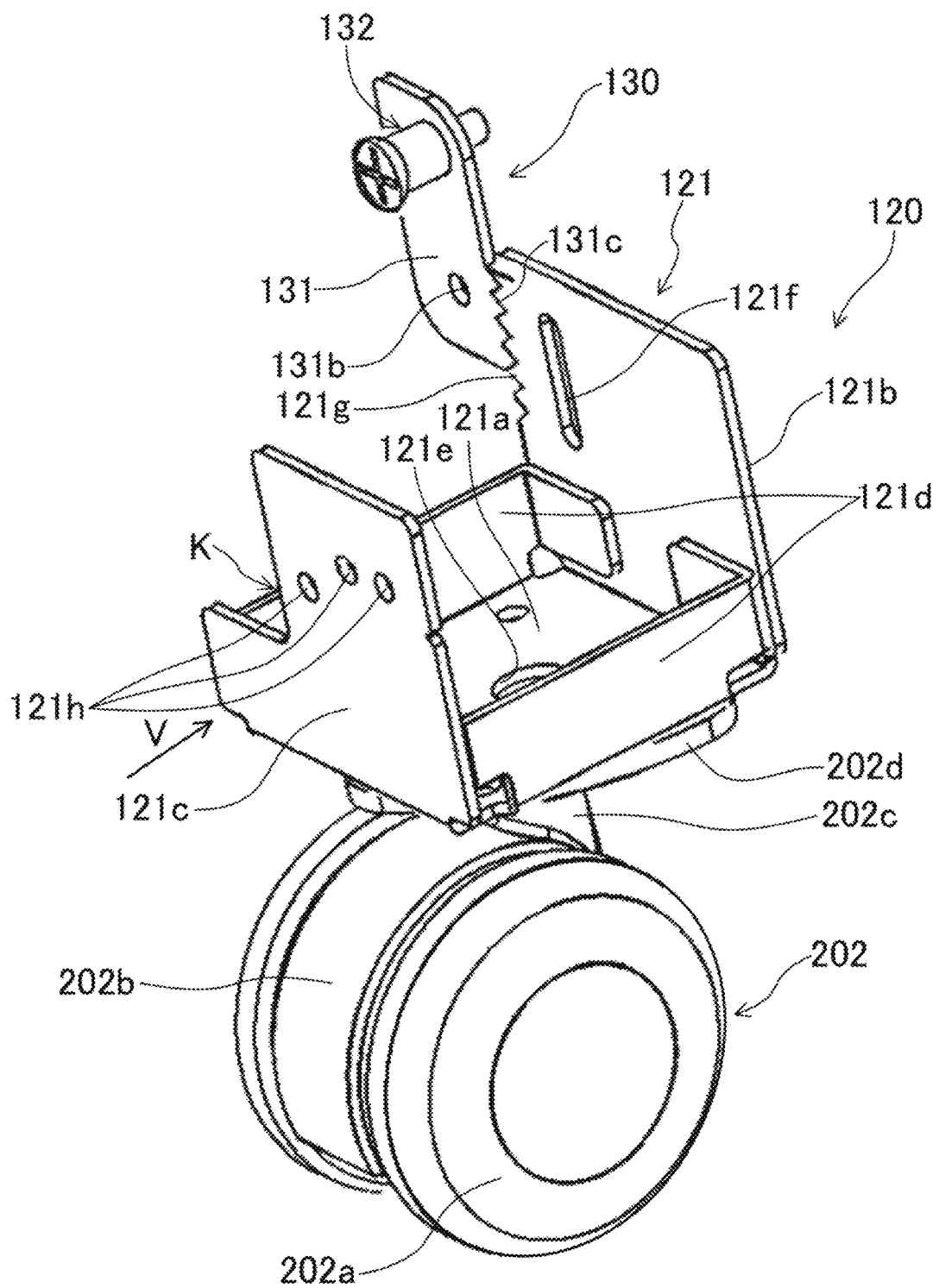
FIG. 6A is a perspective view of the caster unit and a displacement preventing unit included in the height adjusting structure.
Figure 6B:
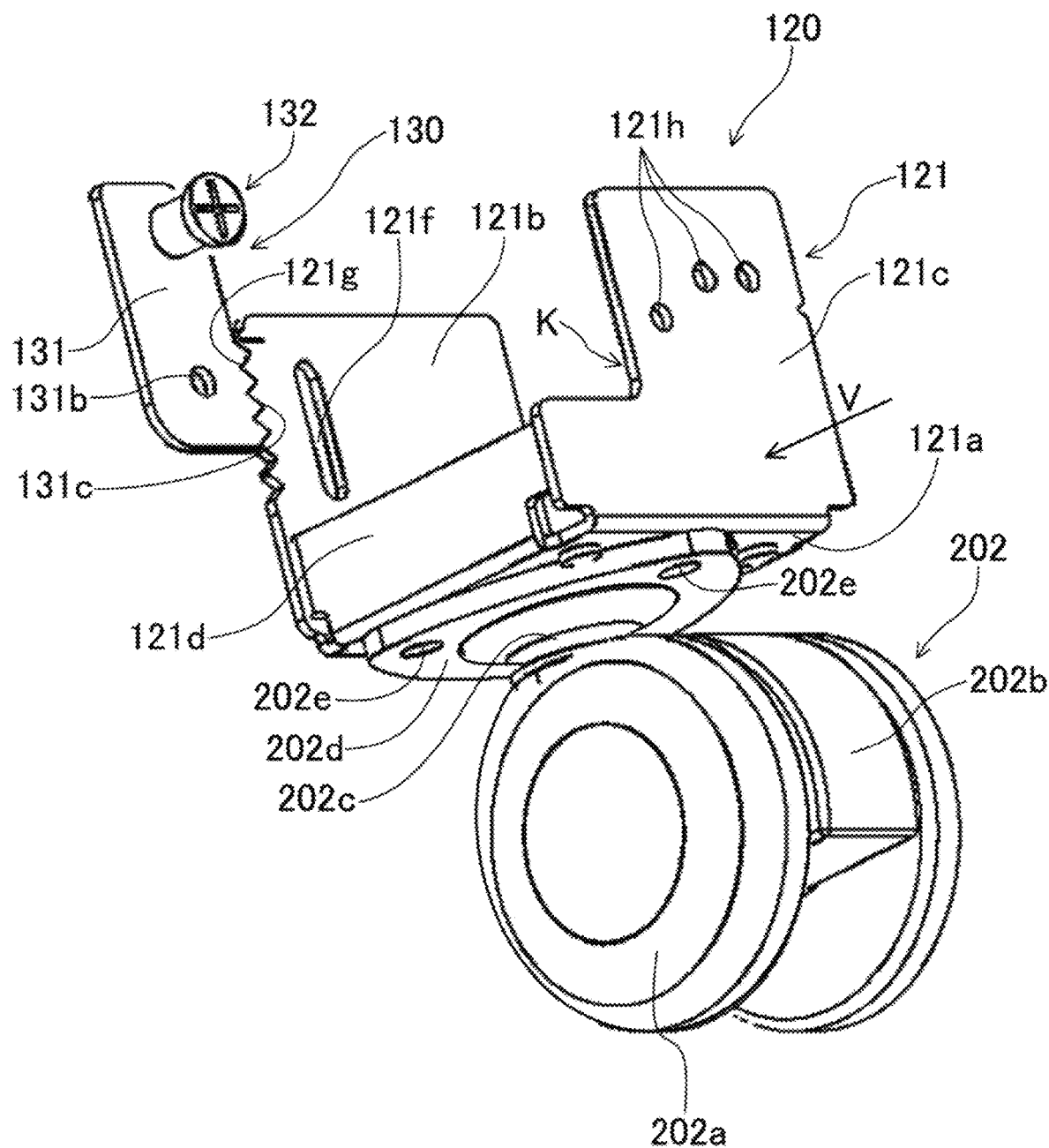
FIG. 6B is a perspective view of the caster unit and displacement preventing unit included in the height adjusting structure.

As shown in FIGS. 6A and 6B, the caster unit 120 includes a caster 202 and a coupling member 121 coupling the caster 202 to the adjusting unit 110 and the bottom frame 220.

The caster 202 has a wheel 202a, a support 202b supporting a rotating shaft of the wheel 202a, a cylindrical seat 202c protruding upward from the support 202b, and an attachment bracket 202d having a substantially triangular plate shape and connected to an upper end of the cylindrical seat 202c. The attachment bracket 202d has attachment holes 202e respectively formed in triangle corners thereof (see FIG. 6B). The caster 202 is fixed to the coupling member 121 by bolts (not illustrated) respectively inserted through the attachment holes 202e.

The coupling member 121 has a square-shaped rectangular plate 121a, an inner extended plate (extended part)121b and an outer extended plate 121c respectively erected from a pair of opposed sides of the rectangular plate 121a, and a pair of square U-shaped walls 121d respectively erected from another pair of opposed sides of the rectangular plate 121a. The coupling member 121 is formed by, for example, bending a single sheet metal.

The rectangular plate 121a has a through hole 121e formed in a center portion thereof. The bottom of the through hole 121e is closed by the attachment bracket 202d of the caster 202. The through hole 121e and the attachment bracket portion 202d together form an insertion hole with a small depth, in which the lower end of the above-described adjustment bolt 111 is inserted and supported.

The inner extended plate 121b and the outer extended plate 121c are formed such that they overlap outer sides of mutually opposed walls formed on both ends of the square U-shaped walls 121d.

The caster unit 120 is formed such that the inner extended plate 121b is located on the casing inner side of the outer extended plate 121c when the caster unit 120 is attached to the casing 201. The inner extended plate 121b is formed in a rectangular plate shape extending in the vertical direction.

The inner extended plate 121c has a slot 121f formed therein which extends in the vertical direction. The slot 121f is formed in an upper portion of a one-side end portion in a width direction of the inner extended plate 121b. The inner extended plate 121b is fixed to the casing 201 by a bolt (not illustrated) inserted through the slot 121f.

The inner extended plate 121b has a meshing part 121g formed on a one-side edge in the width direction thereof. The meshing part 121g is formed by a rack gear unit including a plurality of teeth (engaging portions) aligned in the vertical direction. The meshing part 121g meshes with a meshing part 131c of a restraining member 131, which is described later, so that vertical displacement of the coupling member 121 is prevented.

The outer extended plate 121c is formed in a rectangular plate shape having a cutout K at a corner thereof. In FIGS. 6A and 6B, the outer extended plate 121c has the cutout K formed at a portion corresponding to the slot 121f of the inner extended plate 121b as viewed in direction V (as viewed in a direction perpendicular to the outer side of the outer extended plate 121c). The outer extended plate 121c further has three screw holes 121h formed therein that are aligned in a plate width direction of the outer extended plate 121c. The three screw holes 121h are used to fix the outer extended plate 121c to the casing 201.

[Configuration of Displacement Preventing Unit 130]

Referring to FIGS. 6A and 6B, the displacement preventing unit 130 includes a restraining member 131 having a rectangular plate shape elongated in the vertical direction, and a support pin (support shaft) 132 supporting an upper end of the restraining member 131 such that the restraining member 131 is able to turn.

The restraining member 131 has a pair of through holes 131a and 131b formed therein that are spaced in a longitudinal direction of the restraining member 131. The support pin 132 is inserted through the through hole 131a (shown only in FIG. 12), while a fixation bolt (not illustrated) is to be inserted through the through hole 131b. The restraining member 131 has a meshing part 131c formed on an edge thereof located on the inner extended plate 121b side. The meshing part 131c is constituted by a rack gear unit consisting of a plurality of teeth aligned in the vertical direction, and is configured to be able to mesh with the meshing part 121g of the inner extended plate 121b.

As shown in FIG. 6C, the restraining member 131 is configured to be able to turn between a restraining position (refer to the solid line in FIG. 6C) for restraining the coupling member 121 so that the coupling member 121 is unable to move vertically and a retracted position (refer to the dashed and double-dotted line in FIG. 6C) for releasing the restriction of the coupling member 121.

In the restraining position, the meshing part 131c of the restraining member 131 meshes with the meshing part 121g of the coupling member 121 (inner extended plate 121b). Thereby, the coupling member 121 is restrained by the restraining member 131 so that it is unable to move vertically.

Turning the restraining member 131 by a predetermined angle in the clockwise direction in FIG. 6C from the restraining position around the support pin 132 causes the restraining member 131 to reach the retracted position, so that the meshing between the meshing part 131c of the restraining member 131 and the meshing part 121g of the coupling member 121 is released.

A back surface of the restraining member 131 has formed therein a circular engagement recess 131d (see FIG. 6C) for holding the restraining member 131 at the retracted position against gravity. The engagement recess 131d is configured to be able to engage with a protrusion 230f (see FIG. 3) formed as a holding part on a vertical plate portion (fixed wall) 230b of the post 230, which is described later. The restraining member 131 is held at the retracted position by the engagement recess 131d being engaged with the protrusion 230f.

[Configuration of Frame Part F]

Next, the configuration of a frame part F of the casing frame 210 where the height adjusting structure 100 is arranged is described with reference to FIGS. 7 to 10.

Figure 7:
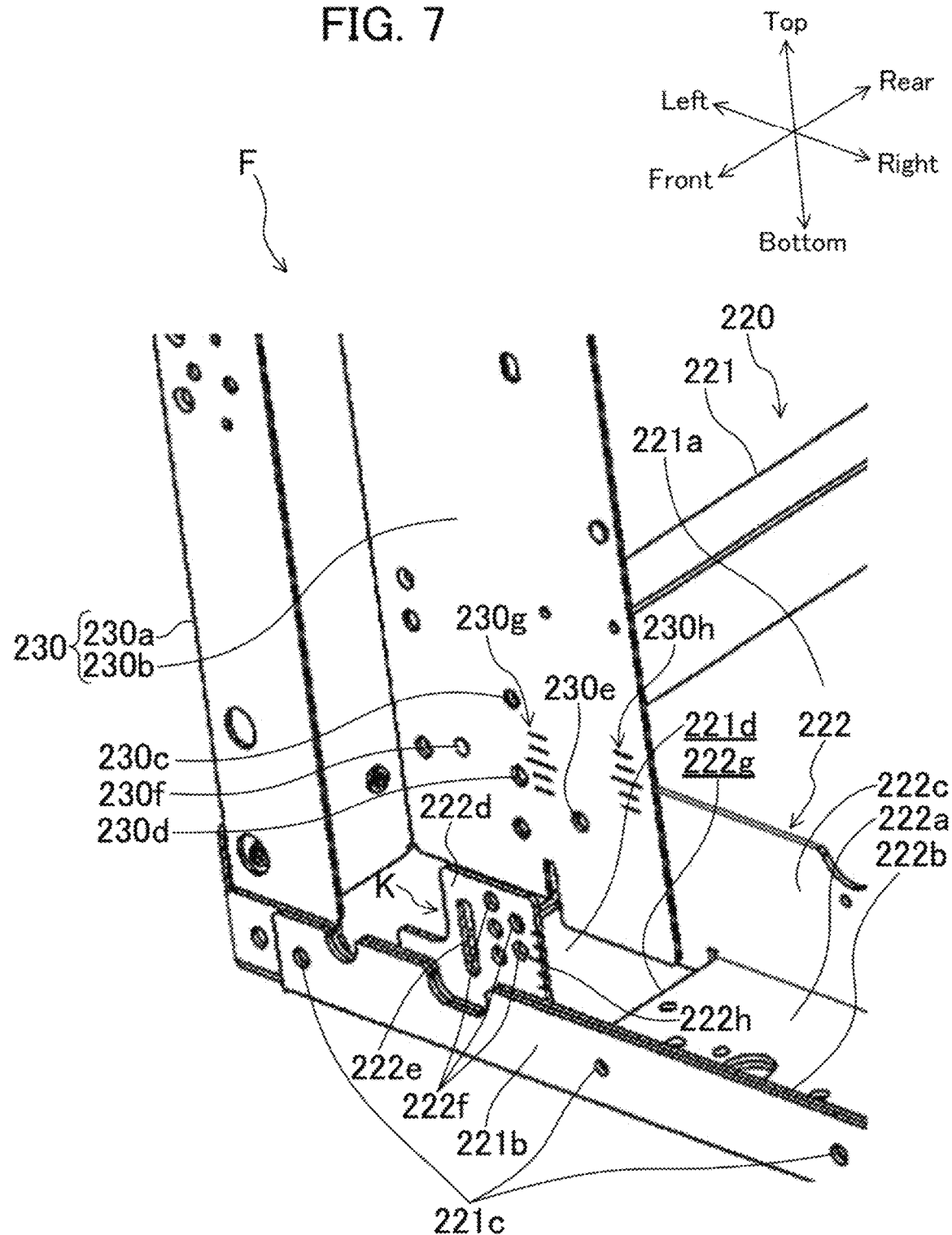
FIG. 7 is an enlarged perspective view of a frame part on which the height adjusting structure is arranged.

FIG. 7 is a perspective view illustrating only the frame part F with both the adjusting unit 110 and the caster unit 120 removed from the height adjusting structure 100 illustrated in FIG. 3.

The frame part F is formed by assembling the base member 221, a stay 222 arranged along a front edge of the base member 221, and the post 230 extending upward from the corner of the base member 211.

As shown in FIG. 8, the base member 221 has a rectangular plate-shaped horizontal plate portion 221a forming the entire bottom surface of the casing 201, and has rectangular plate-shaped vertical attachment plates 221b respectively erected from edges of the horizontal plate portion 221a. Each vertical attachment plate 221b has formed therein two or more screw holes 221c for fixing a sheet metal cover forming an outer side surface of the casing 201.

The horizontal plate portion 221a has a rectangular opening 221d formed in a front left end portion thereof. The horizontal plate portion 221a further has formed therein screw holes 221e respectively formed on the left and right of the rectangular opening 221d, which are used to fix the attachment pieces 112b of the support member 112 (see FIG. 5).

Figure 9A:
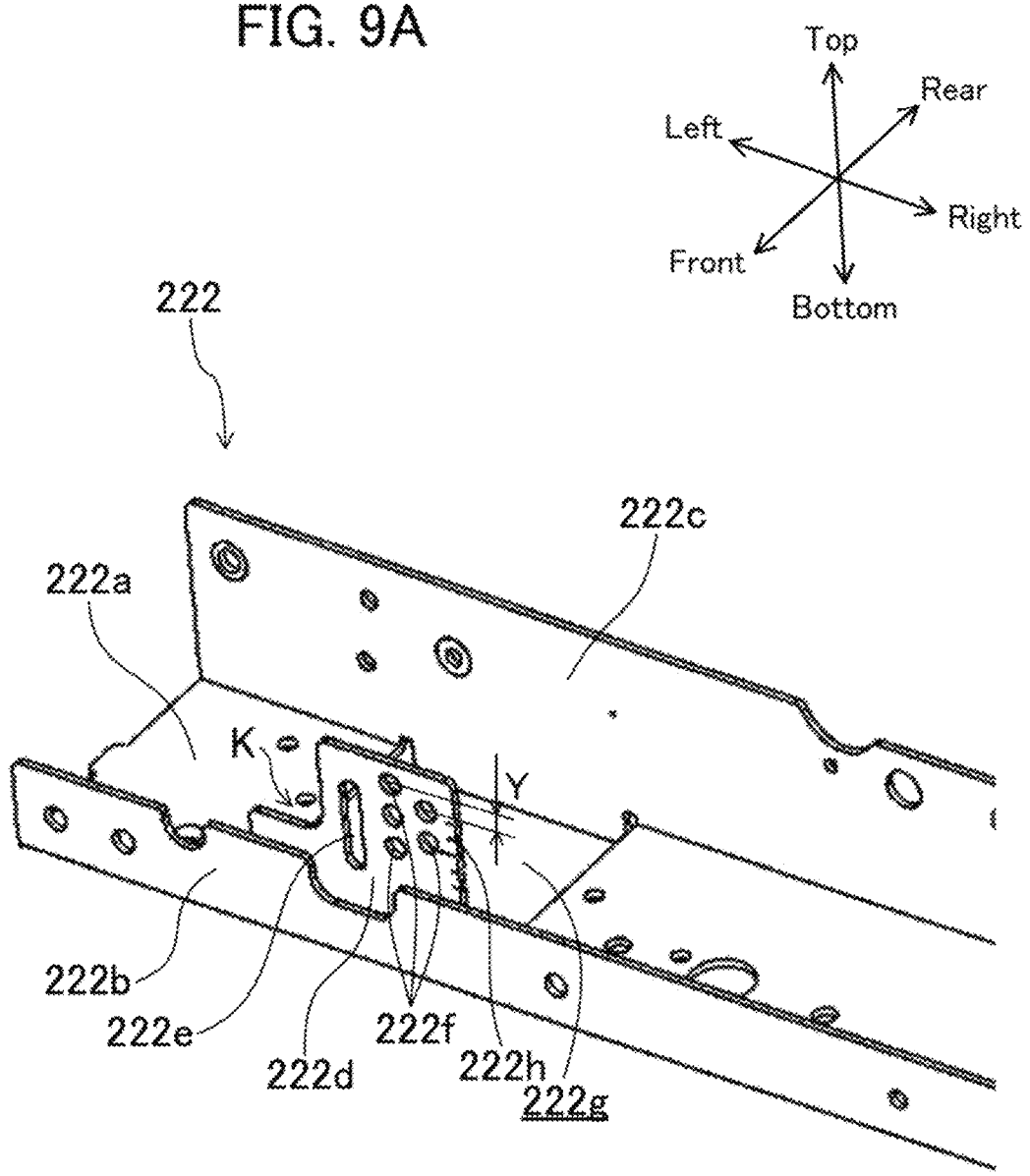
FIG. 9A is a perspective view of a stay constituting the frame part.

As shown in FIGS. 9A and 9B, the stay 222 has an extending plate 222a superimposed on an upper surface of the horizontal plate portion 221a of the base member 221 and extending in the left-right direction, and an outer vertical plate portion 222b and an inner vertical plate portion 222c respectively erected from both edges in a width direction of the extending plate 222a.

The say 222 is configured such that the inner vertical plate portion 222c is located on the casing inner side with respect to the outer vertical plate portion 222b when the stay 222 is mounted on the base member 221.

Th extending plate 222a has a rectangular opening 222g formed in a left end portion thereof. The rectangular opening 222g has a periphery which substantially coincides with the periphery of the rectangular opening 221d of the base member 221. Au upright plate 222d is coupled to an edge of the rectangular opening 222g of the extending plate 222a located on the outer vertical plate portion 222b side. The upright plate 222d is formed by cutting and erecting a portion of the extended plate 222a.

The upright plate 222d has a slot 222e, which extends in the vertical direction, and five attachment holes 222f formed therein. The five attachment holes 222f are formed in an area located on the right of the slot 222e of the upright plate 222d. The five attachment holes 222f are arranged in two rows, one consisting of three attachment holes 222f, the other consisting of two attachment holes 222f. In other words, the five attachment holes 222f are arranged in two rows, i.e., right and left rows, such that they form a zig-zag pattern. The three attachment holes 222f in the left row are arranged at regular intervals in the vertical direction, while the two attachment holes 222f in the right row are arranged such that they are respectively positioned midway between adjacent ones of the attachment holes 222f in the left row in the vertical direction. Thus, the five attachment holes 222f are regularly arranged at a predetermined pitch Y (see FIG. 9A) in the vertical direction. The predetermined pitch Y coincides with a pitch interval of the teeth forming the mesh portion 131c of the restraining member 131 (that is equal to a pitch interval of the teeth of the meshing part 121g of the inner extended plate 121b).

The upright plate 222d also has a scale 222h on an edge portion thereof adjacent to the five attachment holes 222f. The scale 222h is constituted by graduation lines arranged at regular intervals in the vertical direction. The scale 222h is used to adjust the position at which the coupling member 121 is fixed to the upright plate 222d.

Figure 10:
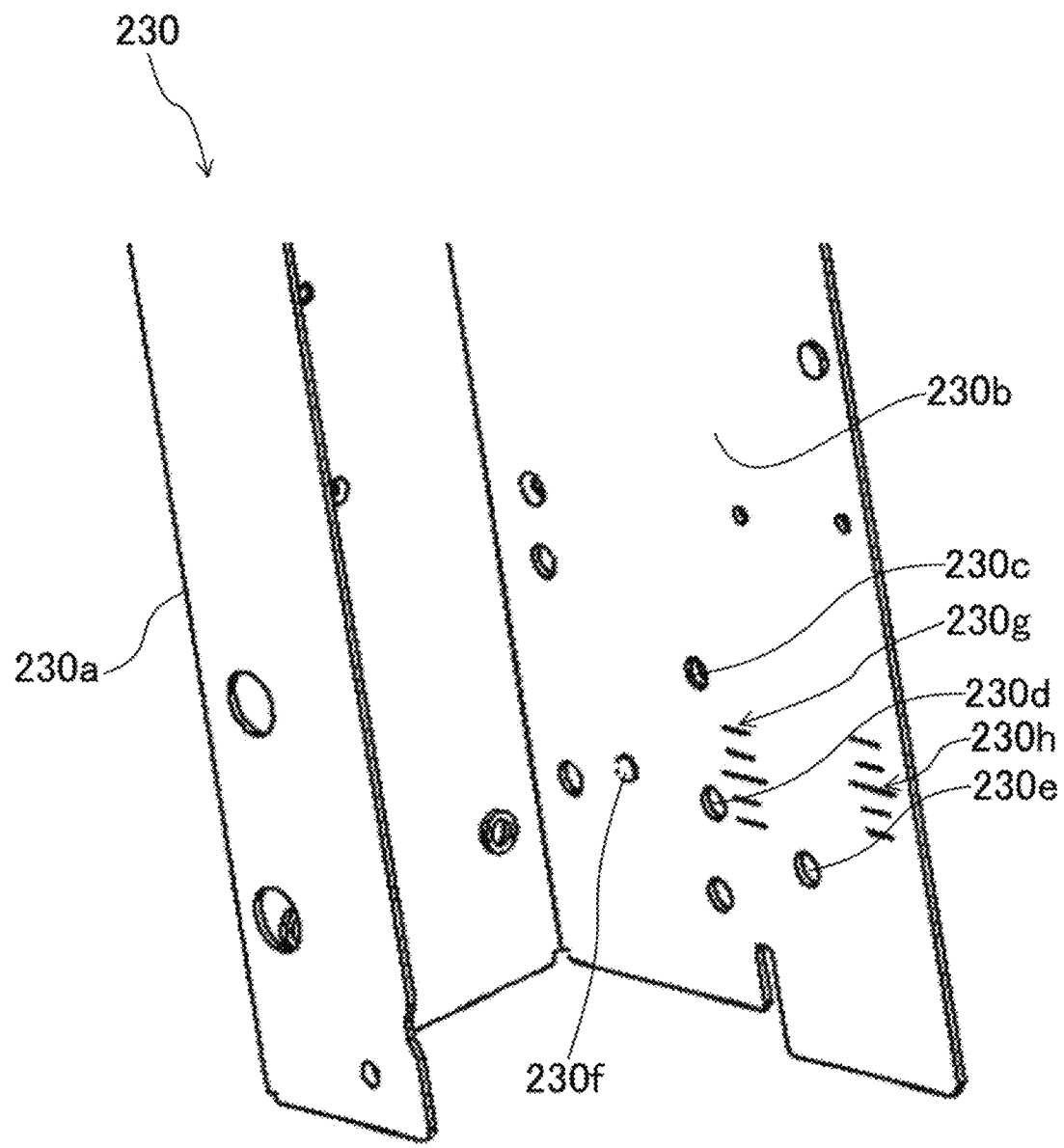
FIG. 10 is a perspective view of a post constituting the frame part.
Figure 11:
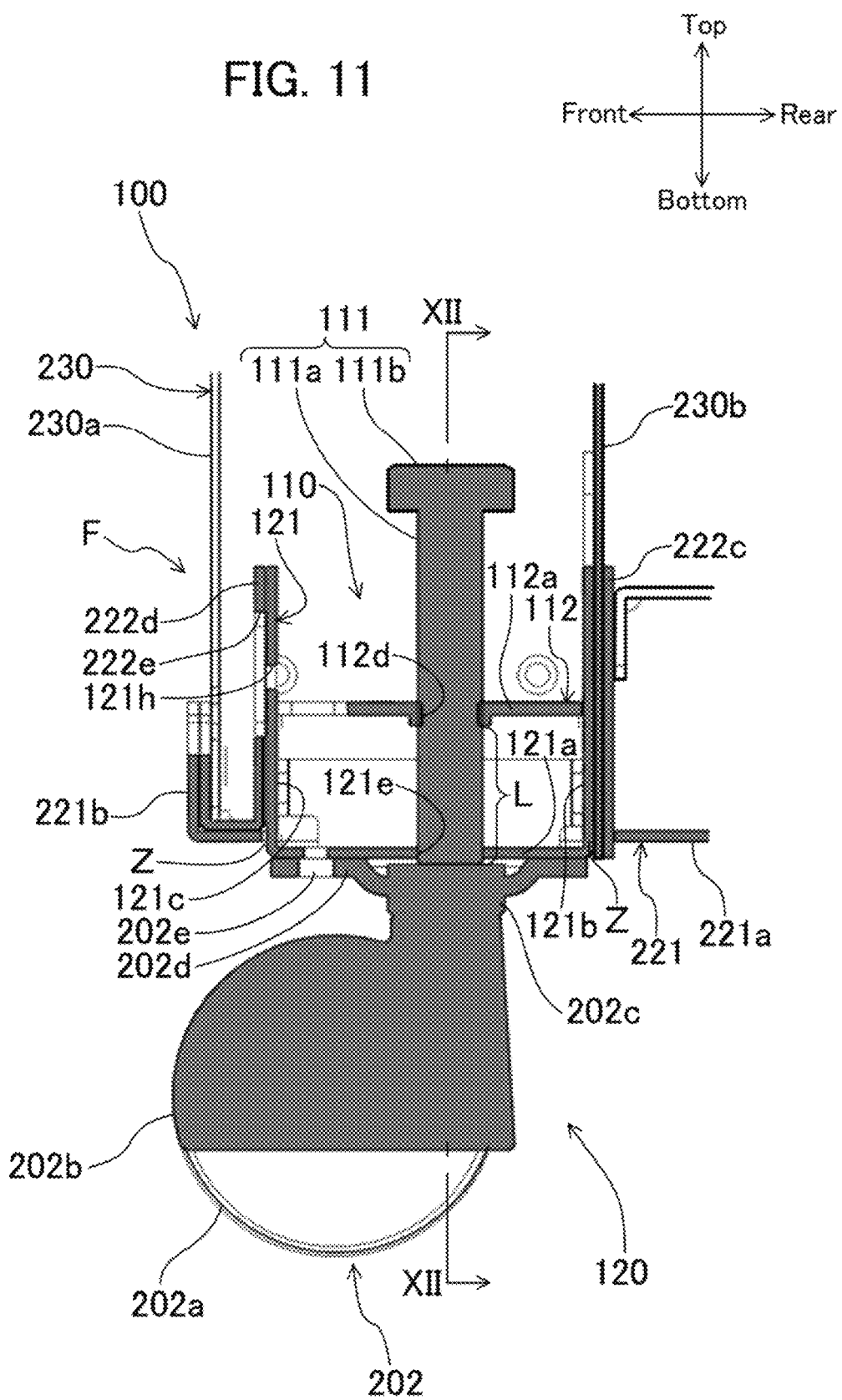
FIG. 11 is a sectional view of the height adjusting structure illustrated in FIG. 3, taken along a vertical plane extending in the front-rear direction through the axis of an adjustment bolt.

As shown in FIG. 10, the post 230 has an L-shaped post portion 230a having an L-shaped cross section and arranged at the corner of the base member 221, and a vertical plate portion 230b protruding toward the inside of the casing 201 from a rear edge of the L-shaped post portion 230a.

The vertical plate portion 230b has formed therein two screw holes 230c and 230d aligned in the vertical direction and a screw hole 230e positioned at a right lower position relative to the lower screw hole 230c.

The screw hole 230c is threadedly engaged with a distal end of the support pin 132 (see FIGS. 6A to 6C) supporting the restraining member 131. The screw hole 230d is threadedly engaged with a bolt for fixing the restraining member 131. The screw hole 230e is threadedly engaged with a bolt for fixing the inner extended plate 121b of the coupling member 121 of the caster unit 120.

Figure 12:
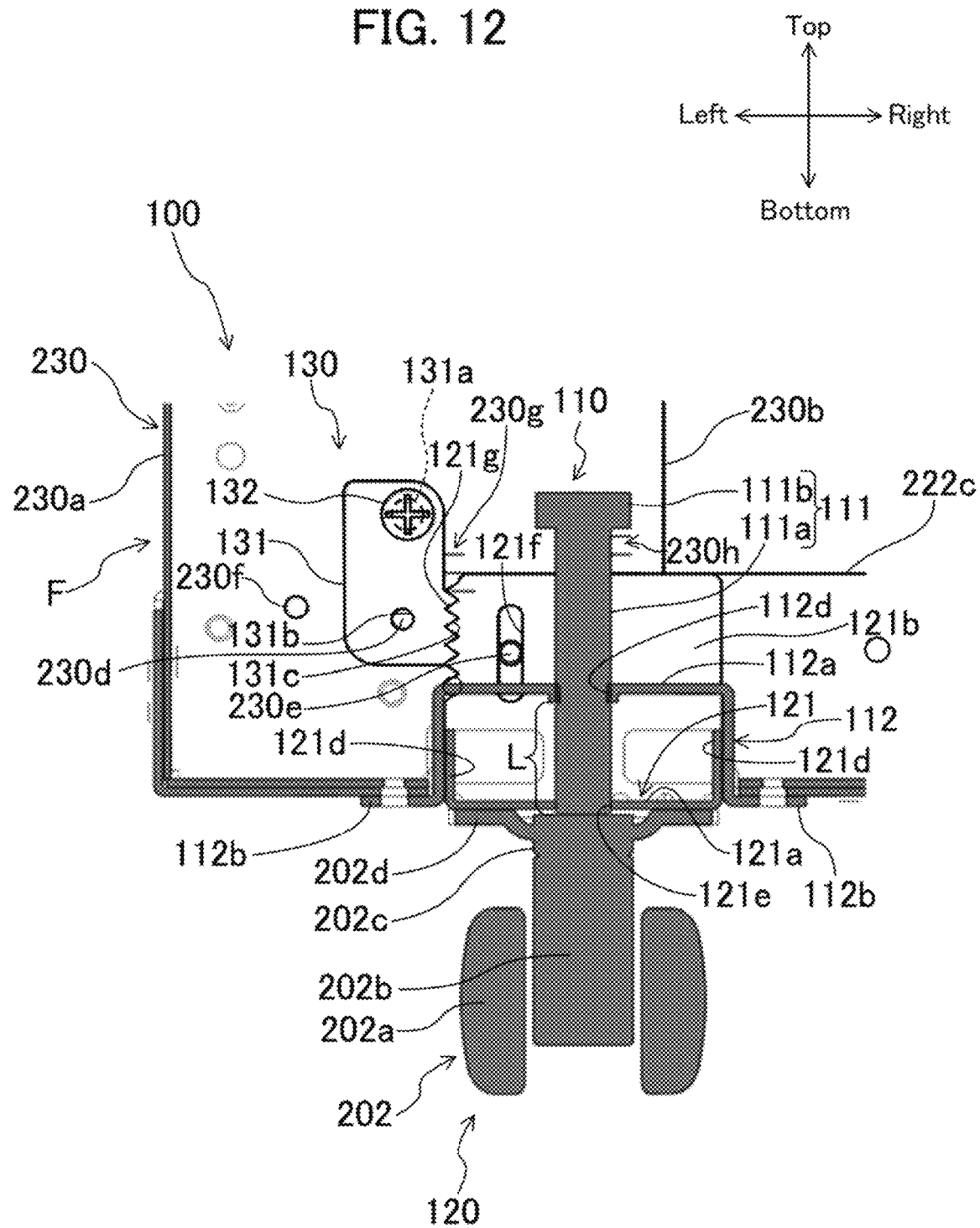
FIG. 12 is a sectional view taken along line XII-XII in FIG. 11.

The vertical plate portion 230b has a scale 230g provided thereon on the right of the two screw holes 230c and 230d, and further has a scale 230h provided thereon at a right higher position relative to the screw hole 230e. Each scale 230g, 230h is constituted by graduation lines arranged with spaces between adjacent graduation lines in the vertical direction. As shown in FIG. 12, the scale 230g on the left side is provided at the position where the meshing between the meshing part 131c of the restraining member 131 and the meshing part 121g of the inner extended plate 121b takes place, while the scale 230h on the right side is provided to be positioned at the center in the width direction of the inner extended plate 121b.

Next, the procedure for mounting the adjusting unit 110 and the caster unit 120 to the frame part F is described with reference to FIGS. 3, 5 11, and 12.

First, as shown in FIG. 5, the adjusting unit 110 is mounted from below to the base member 221 that is a constituent of the frame part F. To mount the adjusting unit 100, the square U-shaped portion 112a of the support member 112 is inserted into the rectangular opening 221d formed in the base member 221, and then the pair of attachment pieces 112b are fixed to the base member 221 with the screws 113.

Note that the support member 112 is set to have a width slightly smaller than a that of the rectangular opening 221d. Therefore, when the support member 112 is fixed to the base member 221, clearances Z (shown only in FIG. 11) each having a slit shape as viewed from below are respectively formed on the front and rear of the base member 221.

To mount the caster unit 120, the inner extended plate 121b and outer extended plate 121c of the coupling member 121 are inserted into the rear and front clearances Z, respectively. Prior to this process, the restraining member 131 of the displacement preventing unit 130 has been moved to the retracted position so that it does not interfere with the inner extended plate 121b.

As the inner extended plate 121b and outer extended plate 121c of the coupling member 121 are inserted deeper into the clearances Z, the lower end of the adjustment bolt 111 penetrates through the through hole 121e of the coupling member 121 and is ultimately brought into contact with a top surface of the cylindrical seat 202c. In this process, the inner extended plate 121b of the coupling member 121 is brought into contact with an inner surface of the vertical plate portion 230b of the post 230, the outer extended plate 121c is brought into contact with an inner surface of the upright plate 222d of the stay 222, and the pair of square U-shaped walls 121d of the coupling member 121 are brought into contact with an inner surface of the support member 112 (see FIGS. 11 and 12). Thereby, the coupling member 121 is restricted so that it is unable to move. Thus, provisional mounting of the caster unit 120 to the frame part F is completed.

To adjust the height of the casing 201, the adjustment bolt 111 is rotated in the above-described provisionally mounted state. This adjustment is, as shown in FIG. 3, carried out with a front sheet metal cover (not illustrated) of the casing 201 removed. Rotating the adjustment bolt 111 changes a protruding length L of the rod 111a (see FIG. 12), thereby changing the height at which the casing 201 is supported by the caster 202.

After the adjustment of the height of the casing 201 is completed, the restraining member 131 is rotated in the counter-clockwise direction in FIGS. 6 and 12 around the support pin 132 so that it is moved to the restraining position from the retracted position. Thereby, the meshing part 131c of the restraining member 131 is caused to mesh with the meshing part 121g of the inner extended plate 121b. In this process, if the meshing part 131c does not successfully mesh with the meshing part 121g, a minor adjustment can be made to the vertical positional relation between the restraining member 131 and the coupling member 121 by rotating the adjustment bolt 111.

After the adjustment of the meshing between the meshing part 131c of the restraining member 131 and the meshing part 121g of the coupling member 121 is completed, the restraining member 131 and the coupling member 121 are fixed to the frame part F of the casing 201. Specifically, a bolt is inserted through the through hole 131b of the restraining member 131 and tightened into the screw hole 230d of the post 230 (see FIG. 12), a bolt (fastening member) is inserted through the slot 121f of the coupling member 121 and tightened into the screw hole 230e of the post (fixed part) 230, a bolt is inserted through the slot 222e formed in the upright plate 222d of the stay 222 (see FIG. 3) and tightened into one of the three screw holes 121h of the coupling member 121, and a bolt is inserted through one of the five attachment holes 222f of the upright plate 222d and tightened into another one of the three screw holes 121h of the coupling member 121. Thereby, the coupling member 121 and the restraining member 131 are fixed to the casing 201. This procedure is carried out for each of the height adjusting structures 100 provided on the four corners of the casing 201, so that the height position of the casing 201 is adjusted.

[Operational Effects]

As described above, the height adjusting structure 100 includes the coupling member 121 for coupling the caster 202 to the casing 201. The coupling member 121 has the rectangular plate (fixing part) 121a fixed with the caster 202, and the inner and extended plates 121b and 121c extending upward from the rectangular plate 121a and penetrating through a bottom wall of the casing 201. The inner extended plate 121b has the meshing part 121g formed thereon. The meshing part 121g includes a plurality of teeth aligned at a predetermined pitch in the vertical direction and is formed at a portion located within the casing 201 of the inner extended plate 121b. Further, the casing 201 also has therein the restraining member 131 that meshes with the meshing part 121g of the inner extended plate 121b to restrain the inner extended plate 121b so that the inner extended plate 121b is unable to move vertically (see FIGS. 3 and 12).

In this configuration, the caster 202 is coupled to the casing 201 by not only the adjustment bolt 111 but also the coupling member 121. Therefore, for example, even if the casing 201 is tilted while it is transported, an inertia force of the casing 201 is received not only by the adjustment bolt 111 but also by the coupling member 121. Consequently, the casing 201 is prevented from being easily displaced from the height thereof already determined by adjustment using the adjustment bolt 111.

In the conventional height adjusting structure, for example, when the casing 201 is tilted in the front-rear direction, a bending moment greater than the casing 201 is applied to the inner and outer extended plates 121b and 121c of the coupling member 121. This makes the bolts fixing the inner and outer extended plates 121b and 121c incapable of withstanding a load from the casing 201, which causes the bolts to be displaced vertically along the slot 121*f* and the slot 222*e* (see FIGS. 3 and 12). Thus, the conventional height adjusting structure has the problem that the height position of the casing 201 already determined by adjustment using the adjustment bolt 111 is easily changed.

To solve this problem, in this embodiment, the meshing part 121*g* that meshes with the meshing part 131*c* of the restraining member 131 fixed to the casing 201 is formed on the inner extended plate 121*b*. This configuration allows the inner extended plate 121*b* to be restricted by the restraining member 131 so that it is unable to move vertically; therefore, the above-mentioned problem of displacement is prevented.

Note that, although no meshing part is provided on the outer extended plate 121*c*, vertical displacement of the outer extended plate 121*c* also hardly occurs in virtue of the restriction of the inner extended plate 121 by the restraining member 131. Therefore, even though the meshing part 121*g* is provided only the inner extended plate 121*b*, it is ensured that the height position of the casing 201 already adjusted is fixed.

Further, in tis embodiment, the restraining member 131 is supported by the support pin 132 such that it is able to turn. Further, the restraining member 131 is configured to be movable between the restraining position at which it meshes with the meshing part 121*g* of the inner extended plate 121*b* to restrain the inner extended plate 121*b* such that the inner extended plate 121*b* is unable to move vertically and the retracted position to which the restraining member 131 is moved by being turned in the direction away from the inner extended plate 121*b* around the support pin 132 to release the meshing (see FIG. 6).

With this configuration, when the height of the casing 201 is adjusted by using the adjustment bolt 111, the restraining member 131 can be retracted to a position at which it does not interfere with the coupling member 121, just by rotating the restraining member 131 around the support pin 132.

Further, the support pin 132 protrudes in a horizontal direction from the vertical plate portion 230*b* of the post 230, and the vertical plate portion 230*b* has the protrusion 230*f* formed thereon. The protrusion 230*f* is engaged with the engagement recess 131*d* formed in the back surface of the restraining member 131 so that the restraining member 131 is held at the retracted position (see FIG. 6C).

With this configuration, the operator does not need to keep holding the restraining member 131 at the retracted position with his/her hand. Therefore, operability in the adjustment of the height of the casing 201 is improved.

Further, in this embodiment, the casing 201 has the square U-shaped plate portion 112*a* provided on the bottom wall thereof, which is open at the lower side and constitutes a part of the support member 112 supporting the adjustment bolt 111. The inner extended plate 121*b* and outer extended plate 121*c* of the coupling member 121 are arranged such that they face each other in contact with both end surfaces in the width direction of the square U-shaped plate portion 112*a*.

In this configuration, the square U-shaped plate portion 112*a* is arranged between the inner extended plate 121*b* and outer extended plate 121*c* of the coupling member 121. Therefore, the inner and outer extended plates 121*b* and 121*c* are each prevented from being inclined toward the other. Consequently, the height position of the casing 201 already adjusted is prevented from being changed due to the inner and outer extended plates 121*b* and 121*c* being inclined.

Further, in this embodiment, the inner extended plate 121*b* of the coupling member 121 has formed therein only the slot 121*f* extending in the vertical direction.

In this configuration, the inner extended plate 121*b* that is less accessible for the operator has only the slot 121*f*. Therefore, the fixation of the inner extended plate 121*b* by means of a bolt is facilitated.

However, since the inner extended plate 121*b* is fixed only by a bolt inserted through the slot 121*f*, the inner extended plate 121*b* is more likely to be subjected to vertical displacement than the outer extended plate 121*c* that has the slot 222*e* and the attachment holes 222*f*. Taking this fact into account, in this embodiment, the meshing part 121*g* that meshes with the meshing part 131*c* of the restraining member 131 is formed on the inner extended plate 121*b*. Thereby, the inner extended plate 121*b* that is likely to be displaced vertically is reliably restricted by the restraining member 131.

Further, in this embodiment, the meshing part 131*c* of the restraining member 131 is constituted by a linear rack gear unit.

With this configuration, since the teeth constituting the meshing part 131*c* are aligned with no spaces between adjacent teeth in the vertical direction, the pitch for adjusting the height of the casing 201 by means of the adjustment bolt 111 can be set to be small.

Further, in this embodiment, the inner extended plate 121*b* of the coupling member 121 has the slot 121*f* formed in a portion thereof corresponding to the cutout K of the outer extended plate 121*c*. Therefore, a bolt can be inserted into the slot 121*f* through the cutout K. Consequently, the operability in the adjustment of the height of the casing 201 is further improved.

OTHER EMBODIMENTS

The technology disclosed herein may be implemented with the configurations described below in the above-described embodiment.

In the above-described embodiment, the restraining member 131 is held at the retracted position by engaging the engagement recess 131*d* formed in the back surface of the restraining member 131 with the protrusion 230*f* formed on the vertical plate portion 230*b* of the casing 201. However, the structure for holding the restraining member 131 is not limited thereto. The restraining member 131 may be held at the retracted position by putting an inner surface of the through hole 131*b* for blot insertion formed in the restraining member 131 around the protrusion 230*f*. With this structure, it is not necessary to form the engagement recess 131*d* in the back surface of the restraining member 131. Therefore, the manufacture of the restraining member 131 is simplified and the product cost is therefore reduced.

In the above-described embodiment, only the inner extended plate 121*b* is restricted by the restricting member 131. However, the present disclosure is not limited thereto. For example, a configuration is possible in which a meshing structure similar to that provided for the inner extended plate 121*b* is provided also for the outer extended plate 121*c*. Alternatively, a configuration is possible in which a meshing structure is provided only for the outer extended plate 121*c*.

In the above-described embodiment, each meshing part 121*g*, 131*c* is constituted by a rack gear unit. However, the present disclosure is not limited thereto. Each meshing part 121*g*, 131*c* may be formed by, for example, arranging a plurality of rectangular or semi-circular engaging portions with spaces between adjacent engaging portions in the vertical direction.

In the above-described embodiment, an example configuration is described in which the height adjusting structure 100 is applied to each accessory device 500. However, the present disclosure is not limited thereto. The height adjusting structure 100 may be applied to the casing 4 of the image forming apparatus 1.

In the above-described embodiment, the direction in which the inner extended plate 121b and the outer extended plate 121c face each other may coincide with the direction in which the post-processing device 200 is attached to the casing 4 of the image forming apparatus 1 (the left-right direction). With this configuration, even if the casing 201 of the post-processing device 200 is tilted in the left-right direction (i.e., the attaching direction) when the post-processing device 200 is attached to the image forming apparatus 1, it is ensured that a inertial force of the casing 201 is received by the inner extended plate 121b and the outer extended plate 121c so that the inertia force is prevented from being directly applied to the adjustment bolt 111.

What is claimed is:

1. A height adjusting structure for a casing, comprising:
an adjustment bolt inserted through a screw hole formed in a bottom wall of the casing; and
a caster supporting a lower end of the adjustment bolt, wherein:
the height adjusting structure includes a coupling member configured to couple the caster to the casing;
the coupling member has a fixing part to which the caster is fixed, an extended part extended upward from the fixing part and penetrating through the bottom wall of the casing, and a meshing part formed at a portion within the casing on the extended part and having a plurality of engaging portions aligned at a predetermined pitch in a vertical direction;
the casing has therein a fixed part to which the extended part of the coupling member is fixed; and
the height adjusting structure further includes a restraining member configured to mesh with the meshing part with the extended part fixed to the fixed part, thereby restraining the extended part so that the extended part is unable to move vertically.

2. The height adjusting structure of claim 1, wherein:
the height adjusting structure further includes a support shaft fixed to the casing and supporting the restraining member such that the restraining member is able to turn; and
the restraining member is movable between a restraining position at which the restraining member meshes with the meshing part formed on the extended part to restrain the extended part so that the extended part is unable to move vertically and a retracted position to which the restraining member is moved by being turned in a direction away from the extended part around the support shaft to release the meshing.

3. The height adjusting structure of claim 2, wherein:
the support shaft extends in a horizontal direction;
the retracted position is located at a position reached by turning the restraining member positioned at the restraining position by a predetermined angle around the support shaft against gravity; and
the height adjusting structure further includes a holding part configured to hold the restraining member at the retracted position against gravity.

4. The height adjusting structure of claim 3, wherein:
the holding part is constituted by a protrusion protruding from a fixed wall within the casing; and
the restraining member has formed thereon an engagement recess configured to engage with the protrusion, and is configured to be held at the retracted position by the engagement recess being engaged with the protrusion.

5. The height adjusting structure of claim 3, wherein:
the holding part is constituted by a protrusion protruding from a fixed wall within the casing; and
the restraining member has a through hole through which a bolt is to be inserted to fix the restraining member at the restraining position, and is configured to be held at the retracted position by an inner wall surface of the through hole being put around the protrusion.

6. The height adjusting structure of claim 1, wherein:
the bottom wall of the casing has formed thereon a square U-shaped plate portion having a square U-shaped cross section with an open lower side;
the screw hole is formed in a top wall of the square U-shaped plate portion;
the extended part extended from the fixing part of the coupling member includes a pair of extended plates arranged to face each other and being respectively in contact with both end surfaces in a width direction of the square U-shaped plate portion; and
the meshing part is formed on at least one of the pair of extended plates.

7. The height adjusting structure of claim 6, wherein:
one of the pair of extended plates of the extended part of the coupling member located on a casing inner side has formed therein a slot extending in the vertical direction and configured so as to receive a bolt for fixation therethrough;
another one of the pair of extended plates located on a casing outer side has formed therein a plurality of through holes configured so as to receive a bolt for fixation therethrough, the plurality of through holes being arranged at the predetermined pitch in the vertical direction; and
the meshing part is formed on the extended plate located on the casing inner side.

8. The height adjusting structure of claim 1, wherein:
the meshing part is constituted by a linear rack gear unit; and
the plurality of engaging portions are formed by teeth constituting the linear rack gear unit.

9. An accessory device for an image forming apparatus, having the height adjusting structure of claim 1.

* * * * *